US012754913B2

(12) United States Patent
Bruno et al.

(10) Patent No.: US 12,754,913 B2
(45) Date of Patent: Oct. 6, 2026

(54) COPROCESSOR UTILIZATION IN DATABASE HOSTS FOR EXPEDITED QUERY PROCESSING

(71) Applicant: Microsoft Technology Licensing, LLC, Redmond, WA (US)

(72) Inventors: Nicolas Bruno, Bellevue, WA (US); Conor John Cunningham, Austin, TX (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 19/038,349

(22) Filed: Jan. 27, 2025

(65) Prior Publication Data

US 2026/0220135 A1 Jul. 30, 2026

(51) Int. Cl.

*G06F 16/2453* (2019.01)
*G06F 16/22* (2019.01)
*G06F 16/242* (2019.01)

(52) U.S. Cl.

CPC .... *G06F 16/24542* (2019.01); *G06F 16/2282* (2019.01); *G06F 16/2425* (2019.01)

(58) Field of Classification Search

CPC ......... G06F 16/24542; G06F 16/24561; G06F 16/2282
USPC .......................................................... 707/713
See application file for complete search history.

(56) References Cited

U.S. PATENT DOCUMENTS

| | | | | |
|---|---|---|---|---|
| 11,921,700 | B1 * | 3/2024 | Al Mahmood | G06F 16/2282 |
| 2003/0229625 | A1 * | 12/2003 | Melchior | G06F 16/2455 |
| 2008/0183688 | A1 * | 7/2008 | Chamdani | G06F 16/2453 |
| 2017/0308555 | A1 * | 10/2017 | Hirzel | G06F 16/211 |
| 2022/0035812 | A1 * | 2/2022 | Balaraman | G06F 16/24535 |
| 2023/0153303 | A1 * | 5/2023 | Doshi | G06F 16/24542 707/718 |
| 2024/0095248 | A1 * | 3/2024 | Morelli | G06F 11/3419 |

OTHER PUBLICATIONS

BRESß, et al., "Robust Query Processing in Co-Processor-accelerated Databases", Proceedings of the 2016 International Conference on Management of Data, Jun. 2016, pp. 1891-1906.

(Continued)

*Primary Examiner* — Hung T Vy
(74) *Attorney, Agent, or Firm* — Holzer Patel Drennan

(57) ABSTRACT

A disclosed method provides for distributing portions of a database query among different processors of a same host device. The method includes determining query fragments collectively executable to implement the database query; identifying one or more subplans for executing the query fragments; accessing capabilities of a hardware coprocessor of the host device; determining, based on the capabilities stored for the hardware coprocessor, whether a select subplan of the one or more subplans is viable for implementation by the hardware coprocessor; and in response to determining that the select subplan is viable for implementation by the hardware coprocessor, selecting and executing a first distributed execution plan that includes the select subplan and that delegates execution of the select subplan to the hardware coprocessor.

19 Claims, 8 Drawing Sheets

(56) References Cited

OTHER PUBLICATIONS

Extended European Search Report Received for Application No. 26153154.5, Mailed on Jul. 1, 2026, 11 pages.

Lu, et al., "SQL2FPGA: Automated Acceleration of SQL Query Processing on Modern CPU-FPGA Platforms", ACM Transactions on Reconfigurable Technology and Systems, vol. 17, No. 3, Sep. 2024, 28 pages.

Yogatama, et al., "Orchestrating Data Placement and Query Execution in Heterogeneous CPU-GPU DBMS", Proceedings of the VLDB Endowment, vol. 15, No. 11, Jul. 2022, pp. 2491-2503.

* cited by examiner

COPROCESSOR UTILIZATION IN DATABASE HOSTS FOR EXPEDITED QUERY PROCESSING

BACKGROUND

Cloud database systems process direct database queries to host servers that utilize central processing units (CPUs) of host servers. In modern compute environments, it is common for servers to additionally include one or more built-in hardware coprocessors such as graphics processing units (GPUs), field-programmable gate arrays (FPGAs), or application-specific integrated circuits (ASICs). These coprocessors, sometimes called "hardware accelerators," are used to accelerate computations in fields such as machine learning, cryptography, data processing, and high-performance computing. In many cases, the spectrum of logical operations supported by these coprocessors overlaps significantly with the spectrum of logical operations commonly used to execute database queries. If these coprocessor capabilities could be leveraged to accelerate certain types of database operations (e.g., queries or partial queries), cloud database providers could benefit from significant reductions in latency. However, different types of hardware coprocessors have diverse capabilities, such as memory, that complicate query and subquery delegation to hardware coprocessors.

SUMMARY

The disclosed technology provides methods for reducing the latency of cloud-based database systems. A disclosed database management system includes a database optimizer and a host device that includes a central processing system and a hardware coprocessor. The database optimizer is stored in memory and executable to identify one or more subplans for executing query fragments of a database query; to access capabilities stored for the hardware coprocessor, including the size of memory accessible to the hardware coprocessor; determine, based on the capabilities stored for the hardware coprocessor, whether a select subplan of the one or more subplans is viable for implementation by the hardware coprocessor; and in response to determining that the select subplan is viable for implementation by the hardware coprocessor, select and execute a distributed execution plan that includes the select subplan and that associates the select subplan with the hardware coprocessor.

The above presents a simplified summary of the innovation to provide a basic understanding of some implementations described herein. This summary is not an extensive overview of the claimed subject matter. It is intended to neither identify critical elements of the claimed subject matter nor delineate the scope of the subject innovation. Its sole purpose is to present some concepts of the claimed subject matter in a simplified form as a prelude to the more detailed description presented later.

Other implementations are also described and recited herein.

BRIEF DESCRIPTIONS OF THE DRAWINGS

DETAILED DESCRIPTION

Figure 1:
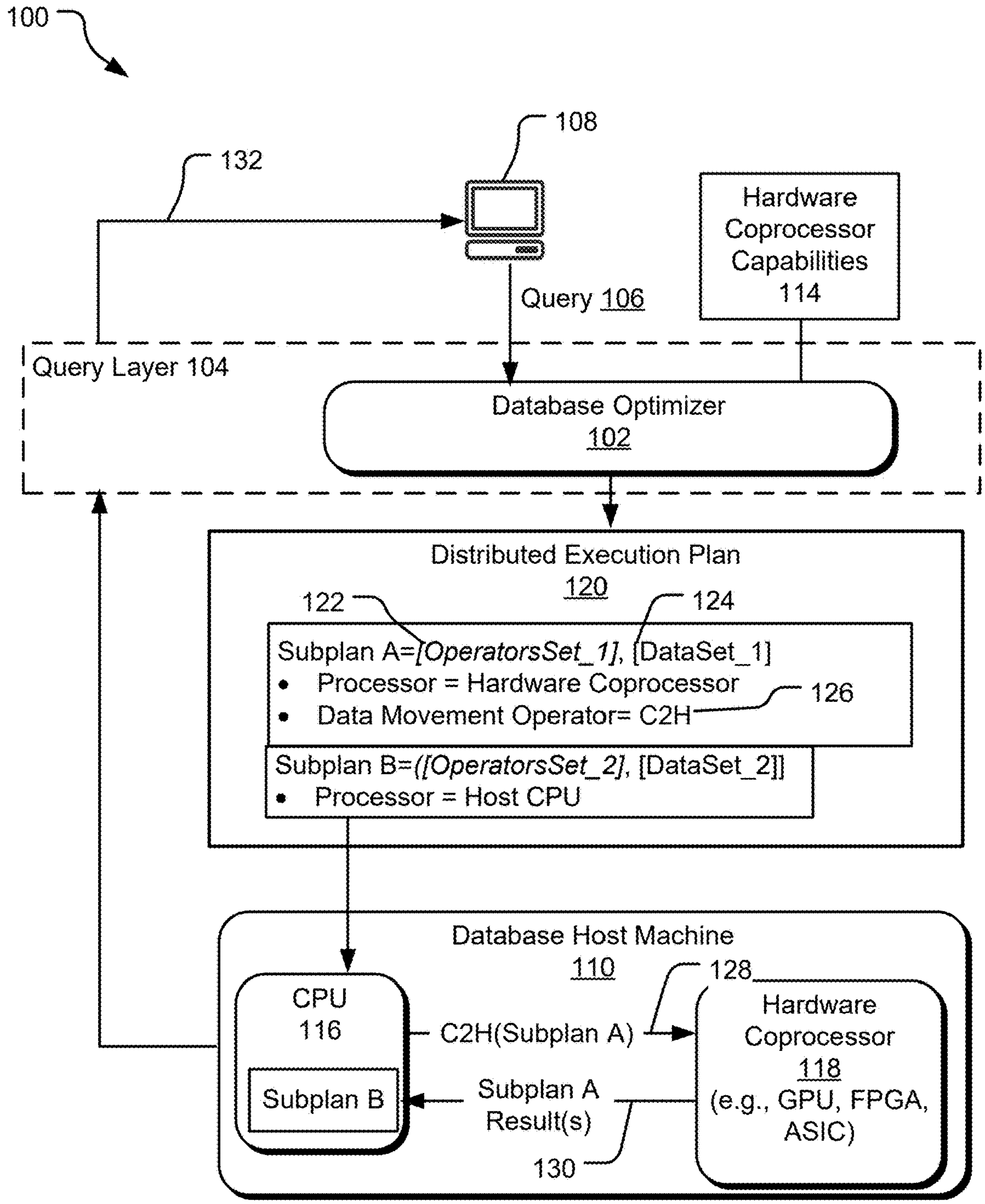
FIG. 1 illustrates an example database system implementing a database optimizer that supports generating distributed execution plans that utilize hardware coprocessors.

A database optimizer is a software component or part of a Database Management System (DBMS) that improves the performance of database queries by selecting the most efficient execution plan. When a query is issued to a database, the database optimizer reviews the query, analyzes different ways to execute the query, and chooses the one that minimizes resource usage (such as CPU, memory, disk I/O, and network bandwidth) while providing the correct results. Optimization may, for example, entail reordering operations that appear in the query to reduce unnecessary computations, reordering the tables in a multi-table query to minimize the amount of data processed at each stage, or deciding whether to use a table index or scan the entire table based on query conditions. Current database optimizers do not execute logic for identifying or selecting between execution plans that divide query operations between a CPU and other hardware coprocessors of a same host device.

The herein disclosed technology includes a database optimizer that expands the search space of a traditional database optimizer by storing capabilities of hardware coprocessor(s) and using those stored capabilities to enumerate viable execution plans that distribute query fragments (sets of logical operators) between a CPU and one or more hardware coprocessors in a database host machine. As used herein, the term "hardware coprocessor" refers to a specialized processor that works alongside a main processor (typically a CPU) to offload and accelerate specific types of computations or tasks. Per the disclosed technology, each query is executed as a sequence of one or more subplans with at least one subplan delegated by a host CPU to a hardware processor in the same host device. Each subplan executed by a coprocessor is initiated via a single query by the CPU that provides the coprocessor with all inputs needed to implement the subplan.

Upon receiving a new database query, the database optimizer analyzes different execution methods. This analysis may entail reproducing the query multiple times and as multiple different execution plans that each include a different sequence of subquery fragments (e.g., sets of logical operators) that are collectively executable to obtain a result for the query.

In addition to identifying various potential execution plans usable to execute a query, the database optimizer evaluates the viability of delegating different combinations of the subquery fragments to hardware coprocessors available within the host device, such as local GPUs, ASICs, and FPGAs. This viability evaluation depends upon the capabilities stored for each of the hardware processors.

Presently, some distributed database systems operate by sending query fragments (partial queries) to different hosts (servers) and orchestrating execution among those hosts to evaluate input queries. In contrast to this, the presently disclosed technology provides techniques for distributing a query among the processors that are physically located within a single host device. Thus, although some systems do employ distributed execution in the multi-host sense, the following disclosure uses the term "distributed execution" to refer to query execution that is distributed, in some way, between a host CPU and one or more hardware coprocessors of the same host device. This includes scenarios where the host CPU executes logical operators of the query as well as scenarios where the host CPU offloads the entire query to hardware coprocessor(s) and conveys result(s) received from those hardware coprocessor(s) back to the requesting client device. Consistent with the above, the following disclosure uses the term "distributed execution plan" to refer to an execution plan that distributes query fragments among a host CPU and one or more hardware coprocessor of a same host device. For example, a single query may be divided into different collections of query fragments, also referred to herein as subplans, that are respectively "distributed" for execution among a host's CPU, GPU, FPGA, or ASIC.

In existing systems that include database optimizers, it is common for the database optimizer to determine a cost, in terms of computational latency, for different identified execution plans. Cost may likewise be determined for host-implemented alternative plans (e.g., execution plan with all components executed by the host CPU), and the database optimizer may further compare the latencies associated with different distributed execution plans and host-implemented execution plans to identify the lowest-latency option.

Like traditional database optimizers, the disclosed database optimizer determines costs associated with different execution plans and selects the lowest-cost plan for implementation. However, since the execution plans being compared and evaluated include distributed execution scenarios, the database optimizer is, in the disclosed systems, configured to estimate latency (e.g., a cost metric) based on stored latency metrics that are specific to the individual hardware coprocessor(s) used to carry out each distributed execution plan.

Notably, the unique and diverse capabilities of different hardware coprocessor(s) may render many delegation options inviable. For example, it may not be possible for a hardware coprocessor to execute a particular subplan if the memory available to the hardware coprocessor is too small to store the input data operated on by the logical operators of the subplan. Likewise, some hardware coprocessors may be unable to support certain types of logical operators. For example, a coprocessor might handle filters and aggregation while being unable to handle join variants. The herein-disclosed techniques allow the database optimizer to efficiently identify distributed execution plans that are supported by the host device possessing each query.

This methodology facilitates computationally efficient identification and comparative evaluation of viable distributed executable plans for a database host based on the specific capabilities of the hardware coprocessors within that device. This selection, in turn, facilitates the offload of query fragments to hardware coprocessors that accelerate the execution of such fragments compared to traditional CPU execution. This identification and selection of lower-latency plan alternatives improves database efficiency by reducing total time-to-data relative to that observed in presently existing cloud-based database systems.

FIG. 1 illustrates an example database system 100 implementing a database optimizer 102 that supports generating distributed execution plans that utilize host coprocessors to process queries or query fragments. The database system 100 includes a query layer 104, which receives database queries issued by users or applications. The query layer 104 acts as an intermediary between each query (e.g., query 106) and the underlying database management system (DBMS) responsible for data storage and retrieval. In FIG. 1, the query layer 104 is shown between a client machine 108 and a database host machine 110 to illustrate its role as a translational intermediary. However, in various implementations, the query layer 104 may physically reside in different locations, including the client machine 108, the database host machine 110, or a server separate from the database host machine 110 and the client machine 108. In some implementations, the query 106 is in the form of Structured Query language (SQL) or other query language. In other implementations that utilize language model technologies to support translation of natural language queries into data query language, the query 106 may be in natural language form.

Although FIG. 1 illustrates a single database host (e.g., database host machine 110), the database system 100 may, in implementations, support distributed processing of database queries among multiple hosts, each of which is further configured to offload some computation from its CPU to its respective coprocessor(s). In a distributed database framework, the query layer 104 identifies the database host machine for the query 106 using traditional selection logic. For example, each different client machine or client application may be preassigned to communicate database queries with a select database host. Alternatively, the query layer 104 may include a load balancer that implements load-balancing logic to select the database host machine for each individual requested query. It is assumed that the query layer 104 identifies the database host machine 110 that is to process the query 106 prior to enumerating and evaluating different execution plans, as discussed further below.

The database host machine 110 includes a central processing system, shown as CPU 116, and at least one hardware coprocessor 118. In some implementations, the database host machine 110 includes multiple hardware coprocessors.

Upon receipt of the query 106 at the query layer 104, the query 106 is passed to the database optimizer 102, which executes logic to identify a most efficient way to execute the query 106 on the database host machine 110. The database optimizer 102 stores hardware coprocessor capabilities 114 for each local hardware coprocessor available to the database host machine 110. One example of a "capability" stored for an individual hardware coprocessor is the size of memory available to the coprocessor for storing inputs to a query operation. A commonality of current hardware coprocessors is that while computation can take advantage of many cores and internal high bandwidth memory, data transfer from CPU memory to coprocessor memory is relatively slow. For this reason, the database optimizer 102 enforces a rule that requires that each coprocessor assigned to execute a subplan have a dedicated memory large enough to store all input data needed to execute the subplan. This restriction disallows traditional execution alternatives used in database systems that handle larger-than-memory data by spilling results out of local memory.

Enforcement of the above-described memory size rule during plan enumeration entails repeated evaluation of a memory capability stored for each available hardware coprocessor. In other implementations, the hardware coprocessor capabilities 114 may define more specific limits on the complexity of computations being offload or impose restrictions on the size of intermediate data generated while evaluating results. For example, hardware limits might rule out expressions beyond a certain size (e.g., at most N conjuncts in a scalar expression), or impose restrictions on the sizes of input and intermediate data.

In addition to imposing constraints pertaining to input data size, the hardware coprocessor capabilities 114 may also define limits on the types of scalar and relational operators that are and are not supported by each of the hardware coprocessors in the database host machine 110. For example, a coprocessor might include logic that supports filters and aggregation but not join variants. Among scalar operators, a coprocessor might be able to evaluate comparisons and operators that support pattern matching, but not other intrinsic functions like converting a string or column value to uppercase or taking the cosine of a given angle. Specific limits on supported operations are defined and stored within the hardware coprocessor capabilities 114 with respect to each hardware coprocessor in the database system 100.

Upon receiving the query 106, the database optimizer 102 utilizes the stored hardware coprocessor capabilities 114 to enumerate viable execution plans, including at least one distributed execution plan that provides for delegating at least some logical operations of the query to a hardware coprocessor (e.g., the hardware coprocessor 118) that is within the database host machine 110. In one implementation, the database optimizer 102 enumerates at least one host-implemented plan (e.g., an execution plan with all components executed by the database host machine 110) in addition to one or more distributed execution plans that have been identified as "viable."

As used herein, a "viable execution plan" refers to an execution plan with subplan component(s) designated for execution to specific processor(s), with each identified processor having physical characteristics that are adequate to implement its corresponding delegated subplan component without error and as a response to a single remote query. In this context, "adequate" physical characteristics imply at least a working memory large enough to store data inputs for the subplan and hardware or software components that support the logical operators referenced in the subplan. With reference to the system shown, this means that database optimizer 102 has evaluated the stored hardware coprocessor capabilities 114 and determined that none of the stored capabilities would prohibit the hardware coprocessor 118 from executing any portion of the subplan(s) that are to be delegated to the hardware coprocessor 118.

To illustrate the conceptual difference between "executions plans" executable to obtain a same query result and "distributed execution plans" executable to cause different portions of a query to execute on different processors of a same host device, assume that the query 106 is a request to return a total count of a number of orders appearing in two different tables—Tables A and Table B—that have both (1) have a first column value satisfying a first criterion in Table A and (2) a second column value satisfying a second criterion in Table B. Although there exist a large number of executable plans to implement this query, an example execution plan (plan A) is shown below. Plan A entails operations A1-A3, which include:

(A1) querying table A to identify the orders that satisfy the first criteria;

(A2) querying table B to identify orders that satisfy the second criteria; and (A3) identifying order numbers that commonly appear in the result sets from A1 and A2.

By contrast, this same query could likewise be executed by another execution plan (plan B) that entails operations B1-B3, which include:

(B1) querying table A to identify orders numbers that satisfy the first criteria;

(B2) querying table B to identify indexed order numbers matching those returned in the result set from B1; and (B3) filtering the result set from B2 to identify orders satisfying the second criteria.

By further example, there exist many different possible distributed execution plans executable by a single host device that support implementation of both of the above execution plans, A and B. For example, execution plan A can be executed according to a first distributed execution plan that includes a first subplan that provides for executing operation A1 and A2 on a hardware coprocessor and a second subplan that provides for execution operation A3 on the host CPU. Alternatively, execution plan A can be executed according to second distributed execution plan that includes a single subplan that provides for executing all of operations A1-A3 on a hardware coprocessor before returning a final result to the host CPU that conveys the result to the requesting client device. By further example, execution plan A could also be implemented according to a host-implemented plan that provides for executing all of operators A1-A3 on the host CPU. Each of these different plans is associated with a different estimated latency (cost), which depend upon metrics stored for the CPU and the hardware coprocessor.

Considering the spectrum of subplan assignments that unfold in the above examples as well as further execution plans that support subplan delegation to multiple different hardware coprocessors in a same device or data passing between different hardware coprocessors, it is easy to see that there exist a large number of distributed execution plans that could be derived from each execution plan (e.g., execution plan A or execution plan B) in the relatively simply example given above.

After enumerating at least two viable execution plans, including at least one distributed execution plan, the database optimizer 102 estimates latency associated with each enumerated viable execution plan and selects the lowest-latency plan for implementation. Notably, a detailed description of latency estimation methodologies is discussed below with respect to FIG. 3. The description of FIG. 1 omits these details to provide a higher-level overview of the scope of functionality provided by the database optimizer 102.

In FIG. 1, the database optimizer 102 is shown selecting for implementation a distributed execution plan 120. The distributed execution plan 120 includes two subplans, Subplan A and Subplan B, that are to be executed by different processors in the database host machine 110. In this example, Subplan A is to be executed by the hardware coprocessor 118 of the database host machine 110 and Subplan B is to be executed by the CPU 116 in the database host machine 110. Each of the subplans defines a set of logical operators (e.g., logical operators 122) and includes an input dataset identifier (e.g., an input dataset identifier 124) that identifies inputs to the subplan. The input dataset identifier 124 may, for example, include the names of one or more database tables or specific partitions of tables that the logical operators are to act upon.

In addition to the above, the distributed execution plan 120 may define a data movement operator 126 in association with one or more of the enumerated subplans. The data movement operator 126 identifies where the results of the subplan are to be transmitted. In one implementation, all subplans delegated from the CPU 116 to the hardware coprocessor 118 include a data movement operator. In the example shown, subplan A includes a data movement operator 126 represented as "C2H"—which stands for "CoprocessorToHost." This indicates that the hardware coprocessor 118 is to send the results of Subplan A to the CPU 116 upon completion of subplan A. Although not shown in the present example, some subplans may include alternative data movement operators. For example, an operator "H2C"—which stands for "HostToCoprocessor"—may be included in some subplans executed by the CPU 116. When present in a subplan, the H2C data movement operator indicates that the CPU 116 is to send computational results of the subplan back to the hardware coprocessor 118.

In alternative implementations that support subplan delegation to multiple hardware coprocessors in a host device, alterative data movement operators may be defined and used to support result transmission between the CPU 116 and specific hardware coprocessors and/or between specific hardware processors. In the example shown, the distributed execution plan 120 lists the subplans in a designated execution order. In this example, the hardware coprocessor 118 is to execute Subplan A, send the results to the CPU 116. The CPU 116 is, upon receipt of the results of Subplan A, to begin executing Subplan B.

The distributed execution plan 120 is transmitted to the CPU 116 of the database host machine 110, and the CPU 116 orchestrates execution of the plan by retrieving the input data set defined by the input dataset identifier 124 for the subplan(s) that are to be delegated to the hardware coprocessor 118. To execute the distributed execution plan 120, the CPU 116 retrieves the input data defined by the input dataset identifier 124, such as by querying one or more database tables and loading the results into CPU-allocated memory. The CPU 116 then transmits Subplan A to the host coprocessor 118 (e.g., as transmission 128), which includes the logical operators 122 and the retrieved input data for Subplan A. The transmission 128 further includes the data movement operator 126 (e.g., C2H). In the implementation shown, the data movement operator 126 is passed as an executable function.

In some implementations, the data movement operator 126 is an executable function that provides error handling and enhanced fault protection. For example, execution of the data movement operator 126 causes the hardware coprocessor 118 to record errors observed during execution of Subplan A and include those errors in a result that is transmitted to the CPU 116 following execution of the subplan. When the result received by the CPU 116 includes an error indicating that the coprocessor-delegated subplan did not execute fully or correctly, the CPU 116 re-executes the coprocessor-delegated subplan, thereby acting as a "fallback" to ensure that a final result can be rendered to the requesting client machine 108 even if the hardware coprocessor 118 is malfunctioning. In some implementations, transmission or execution of the data movement operator 126 initiates a timer that, upon expiration, causes the CPU 116 to automatically re-execute the coprocessor-delegated subplan (e.g., Subplan A). If, for example, the hardware coprocessor 118 does not return an execution result within a threshold period of time, the CPU 116 independently executes Subplan A. Thus, the data movement operator 126 allows the CPU 116 to serve as a redundant "fallback" processor that re-executes coprocessor-delegated subplan(s) when faults are observed.

The hardware coprocessor 118 executes the logical operators 122 on the received input data and, due to the presence of the C2H operator, transmits the results of the operation(s) back to the CPU 116 (e.g., as results 130). In this example, the results 130 serve as input to the next subplan in the distributed execution plan 120—e.g., Subplan B, which is executed by the CPU. The results of Subplan B are then returned to the client machine 108 (e.g., as results 132).

Since the hardware coprocessor 118 uses hardware to accelerate certain types of logical operations included in Subplan A, the above-described use of the hardware coprocessor 118 to execute a portion of the query 106 allows the results 132 to be returned to the client machine 108 with lower latency than if the CPU 116 had been used to execute all of Subplan A and Subplan B.

Figure 2:
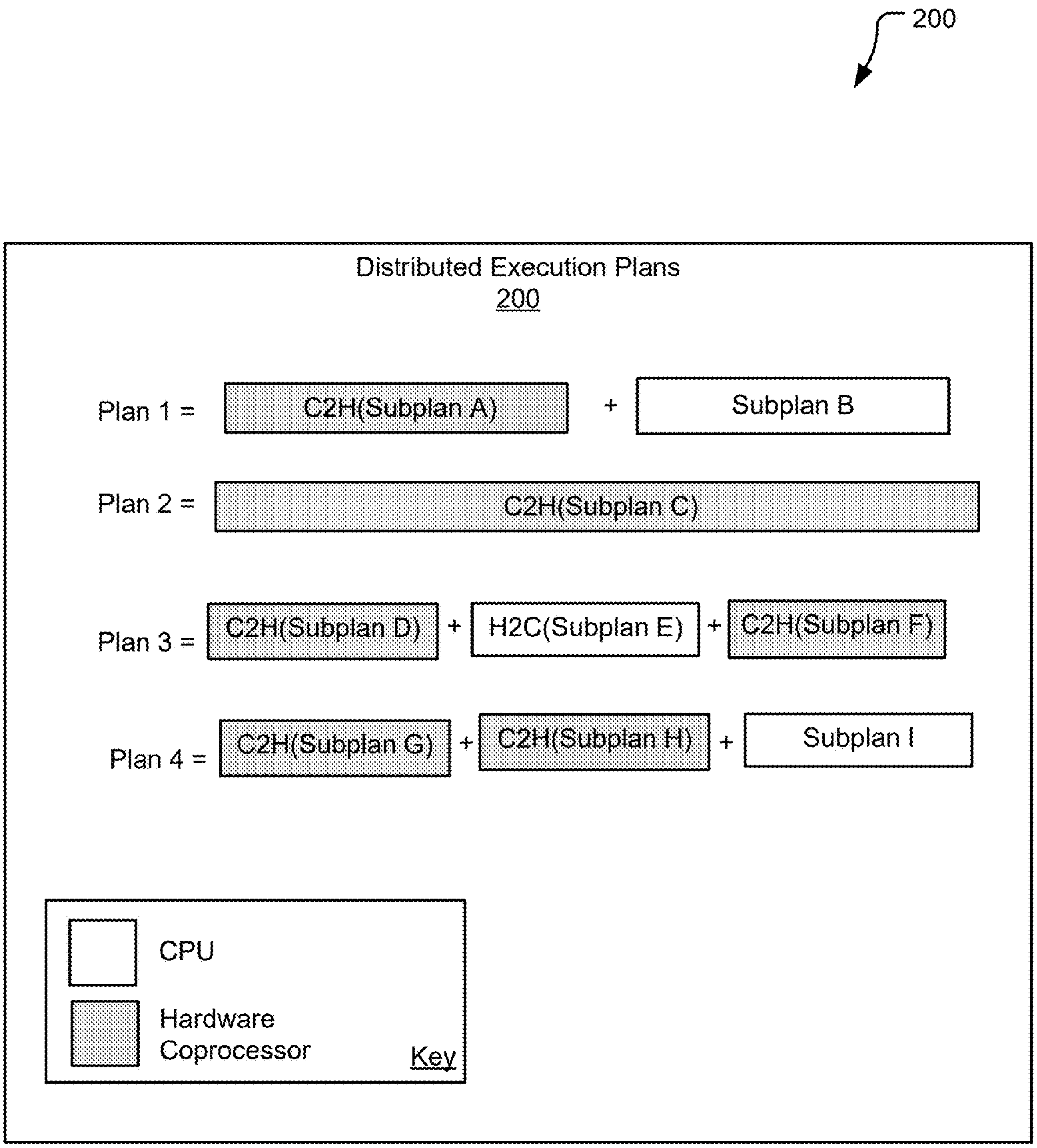
FIG. 2 illustrates examples of different distributed execution plans that utilize a hardware coprocessor to implement a database query.

FIG. 2 illustrates examples of different distributed execution plans 200 that may be used to execute a same database query. Each of the different distributed execution plans 200 includes one or more subplans (e.g., subplans A-I) associated with (e.g., to be delegated to) a hardware coprocessor of the host device. Each subplan defines a set of logical operators and input data (e.g., tables or table partitions) on which the logical operators of the subplan are to be evaluated. The different distributed execution plans 200 are assumed to be generated for a host device that includes a single hardware coprocessor in addition to its CPU. In this representation, subplans executed by the CPU are represented as unshaded rectangles, while subplans executed by the hardware coprocessor are represented as shaded rectangles. Since each of the different distributed execution plans 200 entails transmission of data between the hardware coprocessor and the CPU, each of the different distributed execution plans 200 includes at least one data movement operator, which is either a C2H operator (indicating that the hardware coprocessor is to send results of the subplan to the CPU) or an H2C operator (indicating that the CPU executing the subplan is to send results of the subplan to the hardware coprocessor).

As in the system described with respect to FIG. 1, a database optimizer generates the different distributed execution plans 200, estimates a latency for each of the different distributed execution plans 200, and selects the lowest-latency one of the plans to the host device to execute the query. Specifically, the selected distributed execution plan is passed to the CPU, which oversees the execution of the entire plan by generating and transmitting remote quer (ies) to initiate the execution of subplan(s) delegated to the hardware processor. The CPU prepares the inputs to each coprocessor-delegated subplan, receives the outputs of the plan, and sends the final results of the query back to the requesting client machine.

It is assumed that the subplans within each of the different distributed execution plans 200 are executed sequentially from left to right. It is further assumed that each different shaded rectangle (coprocessor-delegated subplan) is passed and transmitted from the CPU to the hardware coprocessor as a separate remote query.

In this example, a first plan (Plan 1) consists of a first coprocessor-executed subplan, Subplan A, followed by a CPU-executed subplan, Subplan B. The CPU initiates Subplan A by retrieving data inputs (e.g., tables or table partitions) to Subplan A and passing the subplan, along with the input data, to the hardware coprocessor. This data is passed as part of a C2H data movement operator, which signals the hardware coprocessor to return the results of the subplan back to the CPU. Upon receipt of such results, the CPU executes Subplan B, which may utilize the results of subplan A as an input, and returns a final result or set of results to the requesting client machine.

A second plan (Plan 2) consists of a single subplan, Subplan C, that is executed by the hardware coprocessor. Note, this is still considered a "distributed plan" (e.g., a plan executed via operators of multiple processors) because the CPU retrieves the input data that is sent to the hardware coprocessor as part of Subplan C, receives the results of Subplan C (e.g., due to inclusion of the C2H data movement operator), and relays these results back to the requesting client machine. Thus, execution of this plan still entails operations that are divided between the CPU and hardware coprocessor.

A third plan (Plan 3) consists of three subplans, including Subplan D, Subplan E, and Subplan F. The CPU retrieves data inputs to Subplan D and sends those inputs along Subplan D and a C2H data movement operator to the hardware coprocessor. Due to the inclusion of the C2H operator, the hardware coprocessor sends the results of Subplan D back to the CPU, which, in turn, executes Subplan E. In this example, Subplan E includes an H2C (HostToCoprocssor) operator, which causes the CPU to send the results of Subplan B directly to the hardware coprocessor.

In various implementations of the database optimizer, it may be more common for the database optimizer to generate subplans with C2H operators than H2C operators. This is because C2H operators are used in subplans that offload computations from the CPU to the hardware coprocessor, which is favored for the types of computations that the coprocessor is capable of accelerating. However, given the diverse characteristics of different types of hardware coprocessors, there may exist scenarios that call for execution of some logical operators that can be executed more efficiently on a host CPU than on a specific available hardware coprocessor. Thus, because there exist some computations that are still performed more efficiently on the host device than the coprocessor, some subplans may include H2C operators as described above. The H2C operator provides the capability of leveraging CPU efficiency of the above-described CPU-efficient operations while offloading other coprocessor-accelerated operations to the hardware coprocessor. The host CPU pushes the results of Subplan E to the hardware coprocessors by including these results in the data inputs to Subplan F. Subplan F is executed by the hardware coprocessor, and the results are returned to the CPU via the C2H operator. The CPU, in turn, relays those results to the requesting client machine.

A fourth plan (Plan 4) consists of two separate remote queries to the coprocessor, denoted as Subplan G and Subplan H, respectively, followed by CPU execution of Subplan I. This approach may be favored when, for example, the hardware coprocessor lacks the requisite memory allocation to concurrently store all data inputs of Subplan G and Subplan H. In this approach, the coprocessor loads the data inputs to Subplan G into memory, returns results, and then loads data inputs to Subplan H into memory. Therefore, the hardware coprocessor does not need to store the data inputs to Subplan G and Subplan H concurrently.

Figure 3:
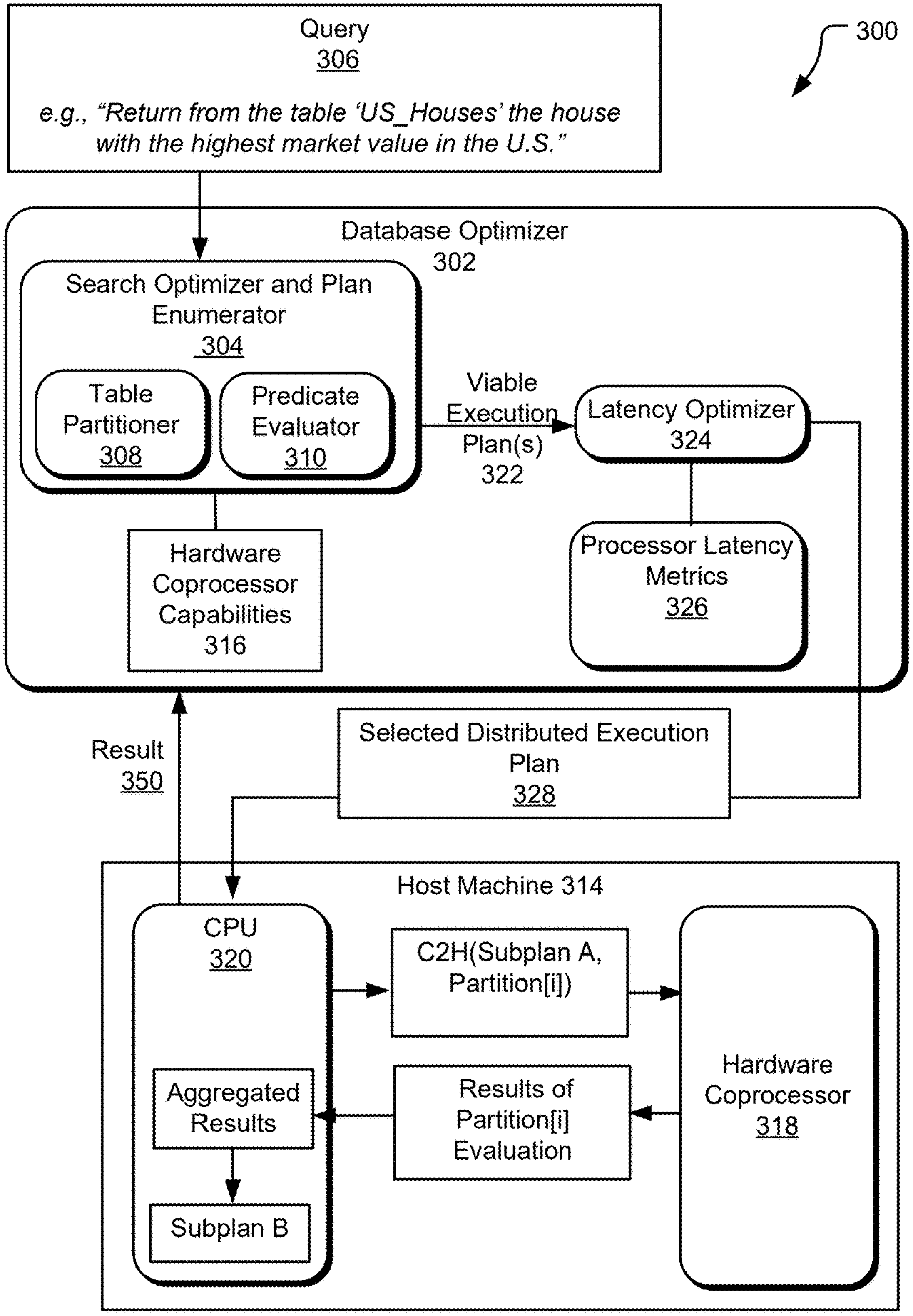
FIG. 3 illustrates another example of a database system implementing a database optimizer that supports the enumeration of viable distributed execution plans that utilize hardware coprocessors.

FIG. 3 illustrates another example database system 300 implementing a database optimizer 302 that supports identification of viable distributed execution plans. Many aspects of the database system 300 are the same as those described with respect to FIG. 1. However, FIG. 3 additionally illustrates subcomponents of a database optimizer 302. The database optimizer 302 includes a search optimizer and plan enumerator 304 that searches for and evaluates viable execution plans for each received query. In the example shown, the search optimizer and plan enumerator 304 is shown receiving an example query "return from the table 'US_Houses' the house with the highest value in the United States." This query is shown in natural language to make the example easier to understand; however, the query 106 may, in some implementations, be composed in a database query language such as SQL.

The search optimizer and plan enumerator 304 includes at least two logical subcomponents that expand the traditional search space and that implement logic to facilitate efficient identification of distributed execution plans that can viably be implemented within a database host machine 314. These components are shown as table partitioner 308 and predicate evaluator 310. These components implement different heuristics to expand the traditional optimizer search space in an effort to identify distributed execution plans that can be viably implemented by the database host machine 314.

Both the table partitioner 308 and predicate evaluator 310 utilize stored hardware coprocessor capabilities 316 to identify one or more distributed execution plans that are viable for implementation in the database host machine 314. This entails using the stored hardware coprocessor capabilities 316 to identify one or more viable distributed execution plans for implementing the query 206 in the database host machine 314 (e.g., based on specific capabilities of a hardware coprocessor 318). These initially identified viable distributed execution plans are then used to "seed" one or more search algorithms. For example, the viable execution plans are used to set up an initial configuration provided as input to a search algorithm, and the search algorithm then uses the initial configuration as a starting point for traversing or exploring the problem space. By following predefined rules to explore the problem space outward from the initially identified viable plan(s), the search algorithm(s) perform a non-exhaustive exploration of alternative plans that are also likely to be viable (e.g., due to the fact that the plan "seed" is a viable plan).

The table partitioner 308 references the stored hardware coprocessor capabilities 316 to determine the size of memory that is available to the hardware coprocessor 318 to store data inputs. This available memory size is referred to in the following example as "Coprocessor Memory Size." The table partitioner 308 also determines the size of one or more tables referenced in the query 306. In the example shown, the query 306 references a single database table named "US_Houses." The table partitioner 308 next determines (e.g., by referencing stored database attributes or querying the database) whether each table referenced in the query has a size (e.g., when placed in memory) that exceeds the size of "Coprocessor Memory Size." If one or more tables referenced in the query 306 are larger than the Coprocessor Memory Size, this means that it is not possible to offload a subplan to the coprocessor that requires loading the entire table into the coprocessor memory.

Thus, upon identifying a referenced table that does not fit into the coprocessor memory, the table partitioner 308 attempts to identify an execution plan that reduces a query operating on the entire table into smaller, iteratively repeated operations on different partitions of the table. If, for example, the table partitioner 308 determines that the table "US_Houses" is too large to load into the memory of the hardware coprocessor 318, the table partitioner 308 determines whether it is possible to find the house "with the highest market value in the U.S." by repeatedly evaluating a query fragment on smaller partitions of the "US_Houses" table that are smaller than the Coprocessor Memory Size and then subsequently performing some further evaluation of the results of the iteratively repeated query fragment. If so, the table partitioner 308 leverages a technique referred to herein as "Table Partitionability" (T-Partitionability) to identify a viable distributed execution plan that is used to seed an explorative path.

In the following description, a query Q over tables $T_1, \ldots, T_N$ is said to be $T_i$-partitionable whenever:

$$Q[T_1, \ldots, T_i, \ldots, T_N] = U_k Q[T_1, \ldots, T_i^k, \ldots, T_N], \text{ where } T_i = U_k T_i^k$$

This means that a request for the query Q can be obtained by partitioning table $T_i$ into pieces $T_i^k$, evaluating the query Q on each $T_i^k$ fragment (replacing $T_i$ by $T_i^k$ and keeping all other tables fixed), and taking the union of the individual results. If $T_i$ does not fit into the coprocessor memory but other smaller tables do, then the query can be evaluated by sending the smaller tables to coprocessor memory, partitioning the large table $T_i$ and progressively sending the large table to coprocessor memory as individual partitions, incrementally building a final result by evaluating one partition at a time.

For the example query 306, the table partitioner 308 may implement the technique of t-partitionability by devising an execution plan that repeatedly loads partitions of the "US_Houses" table into memory of the hardware coprocessor 318 and evaluates those partitions on the hardware coprocessor 318 by identifying and returning a singular house within the partition that has the highest market value. For this particular example, the query 306 could be executed by sequentially sending 50 individual queries to the hardware coprocessor 318 with each individual querying including table rows corresponding to houses within a select one of the 50 states. Results from the 50 iterations of the remote query (e.g., the house of highest market value in each state) could then be aggregated by a CPU 320 of the database host machine 314 to identify the single house of greatest market value in the United States.

Per the above operations, the table partitioner 308 uses the technique of table partitionability to identify at least one distributed execution plan that includes a subplan with a data input size that fits within the usable memory of the hardware coprocessor 318. This plan is used to "seed" additional search, either by the predicate evaluator 310 or additional search algorithms implemented by the search optimizer and plan evaluator 304.

Similar to the table partitioner 308, the predicate evaluator 310 expands the traditional search space by employing other, different techniques that facilitate the identification of viable distributed execution plans for executing the query 306 based on the hardware coprocessor capabilities 316 stored for the hardware coprocessor 318. Upon receiving a query (which may be either the query 306 or another representation of the query 306, such as a distributed execution plan generated by the table partitioner 308), the predicate evaluator 310 references the stored hardware coprocessor capabilities 316 to identify operators that are unsupported by the hardware coprocessor 318. Then, the predicate evaluator 310 analyzes the query to determine whether it contains any predicates including the unsupported operators. If so, the predicate evaluator 310 attempts to reconstruct the query in a way that allows certain query fragments to still be offloaded to the hardware coprocessor 318.

In the context of database systems, the term "predicate" refers to an expression (including one or more logical operators) that evaluates to a Boolean value (true or false). A predicate is used to define conditions for filtering or constraining data, and it is commonly found in the WHERE clause of SQL queries. A predicate is typically used to specify the criteria that must be met for a row of data to be included in the result set. With some exceptions (e.g., expensive predicates), traditional database optimizers typically consider plans that evaluate predicates as early as possible so that early filtering is applicable. Although generally efficient, this approach can cause problems when predicates contain operators that are outside of the capabilities of the hardware coprocessor 318.

Consider an SQL query like:

SELECT R.r4, S.s4
FROM R JOIN S ON R.r1=S.s1
WHERE R.r2=5 AND substring (R.r3, 1, 3)='foo'

In natural language, this query instructs the following operations:

1. Select column r4 from table R and column s4 from table 2.
2. From these two selected columns (r4 and s4), identify the column values that are included in rows that have matching values in column s1 of table 1 and column r1 of table 1; and
3. From the result set of (2), return the rows where the r2 column in table R has a value of 5 and the substring "foo' is included in the first 3 letters of column r3 of table R.

Assume, in the above example query, that the hardware coprocessor capabilities 316 indicate that the hardware coprocessor 318 does not support the "Substring" operator. In response to determining this, the predicate evaluator 310 attempts to push the unsupported predicate (the filter on "substring") "up" in the logical root-to-leaf tree (where leaf is evaluated first and root last) such that a first part of the query can be initially evaluated by the hardware coprocessor 318 and the CPU 320 can then subsequently evaluate a second portion of the query that includes the unsupported operator.

In this case, the predicate evaluator 310 may consider a distributed execution plan that splits the unsupported predicate (e.g., WHERE R.r2=5 AND substring (R.r3, 1, 3)='foo') into two. For instance, the hardware coprocessor 318 may evaluate the portion:

SELECT R.r4, S.s4
FROM R JOIN S ON R.r1=S.s1
WHERE R.r2=5 and the CPU 320 could then filter on these results to return the rows that match the "substring" condition (e.g., substring (R.r3, 1, 3)='foo').

In the above way, the predicate evaluator 310 identifies predicates that contain operators not supported by the hardware coprocessor 318 and reconstructs input queries in ways that "push" those unsupported predicates up the logical root-to-leaf tree, such that the resulting execution plan includes a "leaf portion" that can be initially evaluated by the hardware coprocessor 318 followed by execution of a "root portion" by CPU 320, with the root portion including the unsupported logical operators.

Upon identifying one or more viable distributed execution plans via techniques described above with respect to the table partitioner 308 or the predicate evaluator 310, the viable distributed execution plans are used to seed a search algorithm of the search optimizer and plan enumerator 304, which explores other alternative options. The viability of each alternative option identified is assessed by identifying the physical characteristics of coprocessors that are needed to implement each plan (e.g., memory requirements of the coprocessor, operators that need to be supported by the coprocessor) and confirming that the hardware coprocessor capabilities 316 of the hardware coprocessor 318 include the coprocessor features that are needed to implement the plan.

A resulting collection of viable execution plans 322 is passed to a latency optimizer 324. The latency optimizer 324, in turn, determines a "total latency estimate" for each of the viable execution plans 322, and selects for implementation the lowest-latency plan. This evaluation of latency entails using stored processor latency metrics 326 to estimate the latency of each subplan component within each plan. If, for example, the viable execution plans 322 include a first plan that provides for executing Subplan A by the hardware coprocessor 318 and then subsequently executing Subplan B by the CPU 320, the latency optimizer 324 determines and estimates a predicted latency for Subplan A that is independent of an estimate of predicted latency for Subplan B. The total latency for the first plan is represented as the aggregation of estimated latencies for Subplan A and Subplan B individually.

The processor latency metrics 326 include latency metrics that are predetermined and specific to both the CPU 320 and the hardware coprocessor 318. The processor latency metrics 326 include, for example: transfer speeds between the CPU 320 and the hardware coprocessor 318 and computation speeds for different operators on different processors (e.g., computation speeds for a set of operators on the CPU 320 and also for the same set of operators on the hardware coprocessor 318). Computation speeds vary based on the size of data being operator upon; thus, the processor latency metrics 326 may additionally include processor-specific tables or functions for translating a specific operator or set of operators on data of a known input data size to a corresponding execution latency within a specific hardware coprocessor. Thus, given a fixed input data input size to each subplan, the specific types of logical operators within the subplan, and the identity of the processor executing the subplan (CPU or coprocessor), the latency optimizer 324 determines estimated latency for each subplan and aggregates estimated subplan latencies within each plan to estimate total plan latency.

The lowest latency plan is selected for implementation and passed to the CPU 320 of the database host machine 314, as generally described with respect to FIG. 1. In the example of FIG. 3, this selected "lowest-latency" plan is shown as "selected distributed execution plan 328." In this example, the selected distributed execution plan 328 includes a first subplan, subplan A, that is iterated repeatedly on different partitions of the table "US_Houses." This subplan includes logical operators that are executable to cause the hardware coprocessor 318 to identity and return the house in the received data partition (partition[i]) with the highest market value. The results for each iteration of Subplan A are returned to and stored by the CPU 320, and the CPU 320 initiates each iteration of Subplan A with a new sub-query. After multiple iterations of Subplan A, the CPU 320 executes Subplan B, which provides for joining the iterated results into a single table and selecting, from the table, the row (house) with the highest market value. The CPU 320 returns this selection, as result 350, to the requesting client device.

Figure 4:
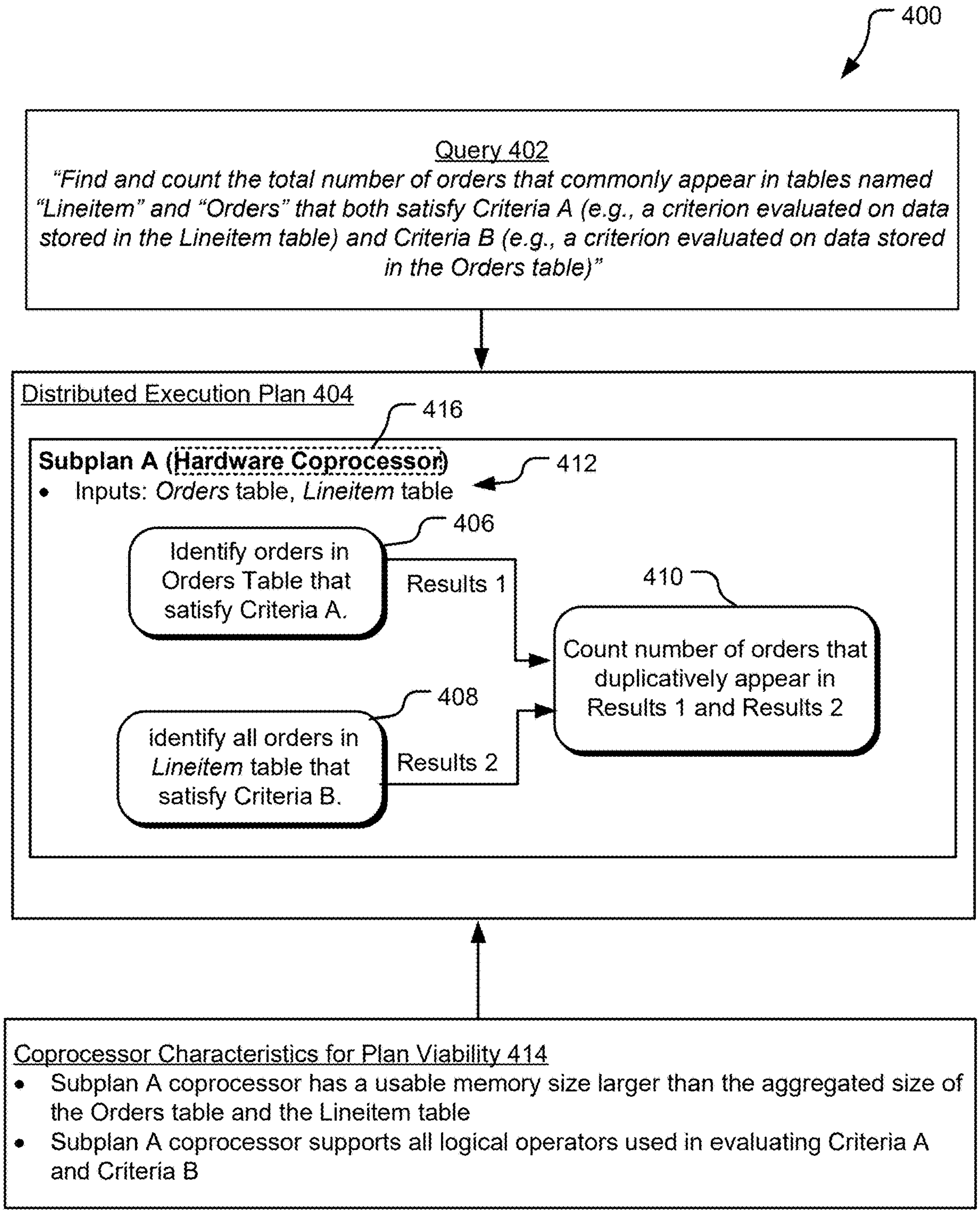
FIG. 4 illustrates aspects of a first example distributed execution plan generated by a database optimizer.
Figure 5:
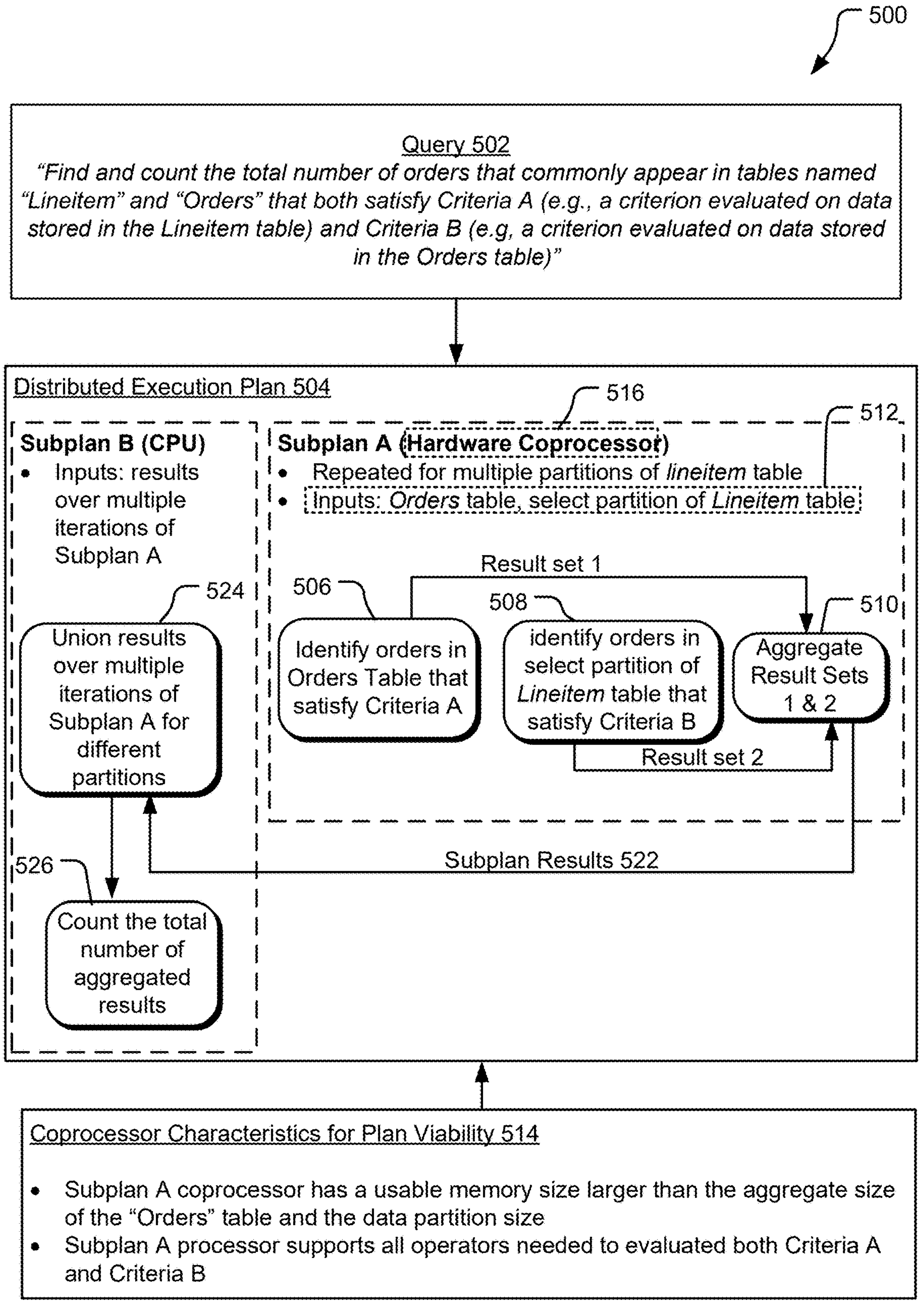
FIG. 5 illustrates aspects of another example distributed execution plan generated by a database optimizer.
Figure 6:
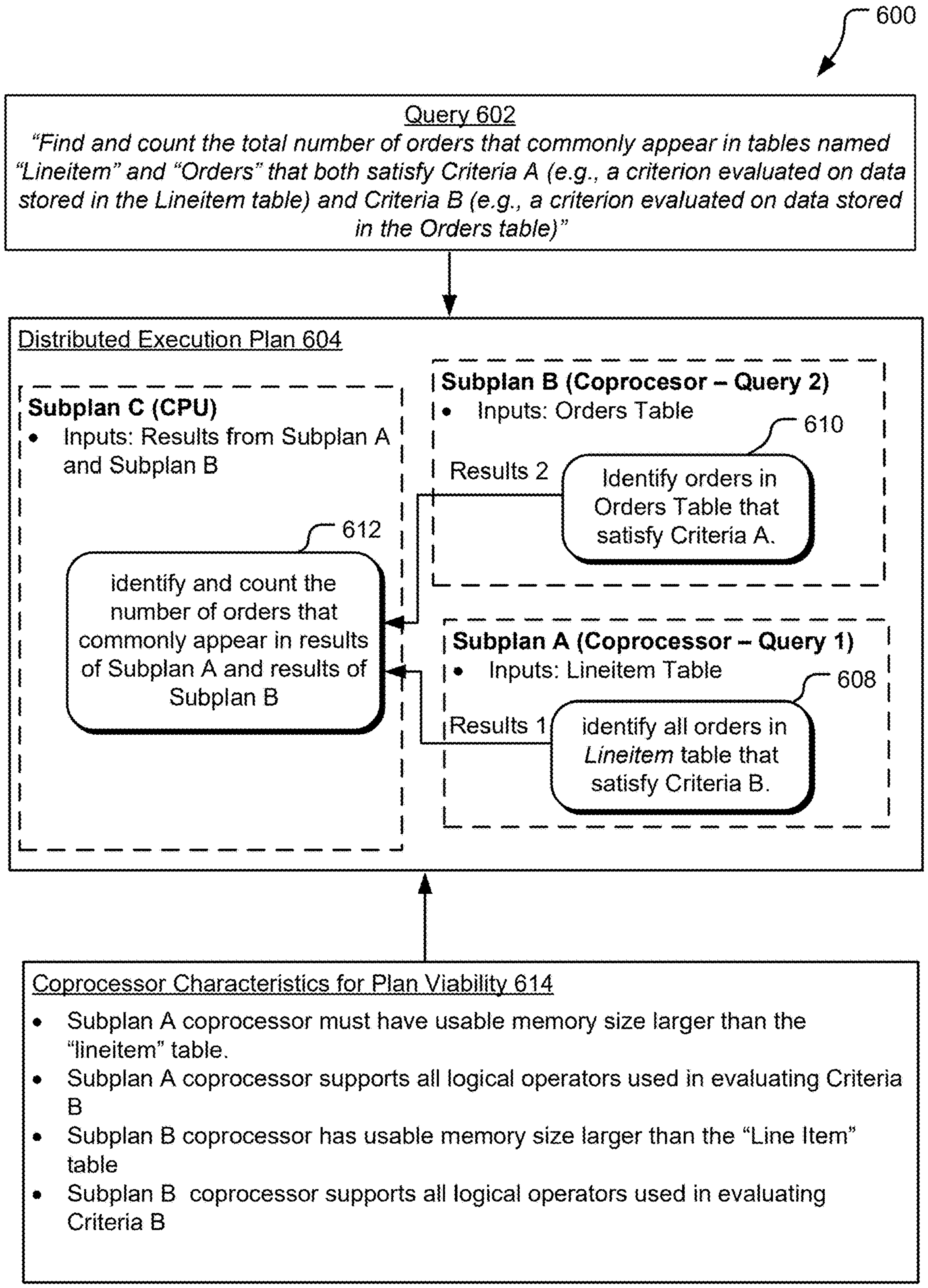
FIG. 6 illustrates aspects of another example distributed execution plan generated by a database optimizer.

FIG. 4-6 illustrate examples of distributed execution plans that are generated by a database optimizer in response to an identical query and determined to be viable for execution in different scenarios that are discussed in detail below with respect to each figure. FIG. 4 illustrates aspects 400 of a first example distributed execution plan 404 that is generated by a database optimizer (not shown) in response to receiving a database query, shown as query 402. Although the query 402 may, in some implementations, be drafted in a database language such as SQL, FIG. 4 illustrates the query 402 in natural language and with terms generalized for simplicity of example. Here, the query 402 is an instruction to the database system to: "Find and count the total number of orders that commonly appear in tables named "Lineitem" and "Orders" that both satisfy Criteria A and Criteria B. Criteria A identifies one or more criteria that are to be evaluated on values stored in the table named "Orders" while Criteria B identifies one or more criteria that are to be evaluated on values stored in the table named "Lineitem."

By further example, the query 402 shown in FIG. 4 may be of the form shown below in Table 1:

TABLE 1

| Example Query Modified Via Execution Plans of FIG. 4, 5, and 6 |
|---|

```
SELECT o_orderpriority, COUNT(*)
FROM orders _
JOIN lineitem _
ON 1_orderkey = o_orderkey
WHERE o_orderdate < '1993-10-01' AND
  AND 1_commitdate < 1_receiptdate)
GROUP BY o_orderpriority
```

The above example query instructs the database system to calculate the number of orders in the "orders" table that:

1. Were placed before Oct. 1, 1993 (an example of Criteria A, discussed above and shown the query 402) and
2. Have at least one associated line item in the lineitem table where the commit date is earlier than the receipt date (an example of Criteria B, discussed above and shown the query 402)

The first distributed execution plan 404 includes a single subplan, subplan A, with all components delegated to a hardware coprocessor. Subplan A includes three logical steps, shown in FIG. 4 as operations 406, 408, and 410 respectively. In the illustrated example, the CPU of a database host device delegates Subplan A to a hardware coprocessor 416 by transmitting the hardware coprocessor 416 a single query that includes at least logical operators instructive for carrying out operations 406, 408, and 410 and a set of inputs 412 that are to be loaded into memory of the hardware coprocessor 416 and accessed during execution of the operations 406, 408, 410. In this example, the set of inputs 412 includes the entire "Orders" table and the entire "Lineitem" table. In some implementations, Subplan A is also sent with a data movement operator (not shown) that causes the hardware coprocessor 416 to transmit the results of Subplan A back to the CPU of the database host device.

In some implementations, the data movement operator is an executable function that causes the hardware coprocessor 416 to track errors during the execution of Subplan A and return error information back to the CPU as part of or in lieu of the results of Subplan A. If the error information indicates that the hardware coprocessor 416 has failed to execute the subplan, or if no results are returned to the host CPU within a threshold period of time following transmission of the remote query, A, the host CPU acts as a "fallback" processor that executes Subplan A in lieu of the hardware coprocessor 416.

To execute Subplan A, the hardware coprocessor 416 loads the Orders table and the Lineitem table into memory. The hardware coprocessor executes operation 406, which parses the Orders table to identify all orders that satisfy Criteria A (e.g., orders that have an order date that is prior to Oct. 1, 1993). The hardware coprocessor 416 also executes operation 408, which parses the "Lineitem" table to identify orders that satisfy Criteria B (e.g., orders with a commit date easier than the receipt date). The results of operations 406 and 408 are then joined and analyzed by operation 410, which counts the number of orders that duplicatively appear in both sets of results. Following execution of the operation 410, the hardware coprocessor 416 transmits the results of operation 410 back to the CPU of the database host device.

In assessing the viability of the distributed execution plan 404, the database optimizer considers a set of coprocessor characteristics 414 that are sufficient to support the implementation of the plan. In the present example, the processor characteristics 414 require that the hardware coprocessor implementing Subplan A have a usable memory size (e.g., Coprocessor Memory Size) larger than the aggregated size of both the "Orders" table and the "Lineitem" table, such that both tables can be stored concurrently in the coprocessor memory. The coprocessor characteristics 414 further require that the hardware coprocessor implementing Subplan A support all logical operators that are used in evaluating both Criteria A and Criteria B.

The database optimizer compares a set of capabilities that are stored for the hardware coprocessor 418 (e.g., hardware coprocessor capabilities 316 of FIG. 3) of the host device to the coprocessor characteristics 414 that are identified as sufficient to support plan viability. Based on this assessment, the database optimizer determines that the capabilities of the hardware coprocessor 416 support all of the coprocessor characteristics 414, and consequently, the distributed execution plan 404 is viable. Provided that the hardware coprocessor 416 can accelerate the types of computations used in evaluating criteria A and criteria B, the use of the hardware coprocessor 416 beneficially reduces total latency incurred during query execution as compared to host-implementation of the operations 406, 408, and 410.

FIG. 5 illustrates aspects 500 of another example distributed execution plan 504 that is generated by a database optimizer (not shown) in response to a query 502. In FIG. 5, the query 502 is identical to the example of FIG. 4. The query 502 has been delegated for execution to a database host with a hardware coprocessor 516, which may be the same or a different coprocessor as that discussed with respect to the example of FIG. 4.

The distributed execution plan 504 represents a plan that is likely to be generated by the database optimizer in a scenario where the combined size of the Orders and Lineitem tables is larger than a stored "input data memory size" capability for the hardware coprocessor 516 (meaning—the distributed execution plan 404 of FIG. 4 is not a viable option). In this example, it is assumed that the "Orders" table is small enough to fit into the memory of the hardware coprocessor 516. However, the "Lineitem" table has a size that independently exceeds the memory available to the hardware coprocessor 516. In response to determining that the "Lineitem" table exceeds the "input data memory size" capability stored for the hardware coprocessor 516, a table partitioner (not shown) of the database optimizer identifies the distributed execution plan 504, which includes two Subplans—Subplan A and Subplan B.

In this example, Subplan A is to be repeated for multiple partitions of the "Lineitem" table and is initiated via a query transmitted to the hardware coprocessor 516 by the host CPU. The iteratively transmitted query includes query fragments with logical operators instructive for carrying out operations 506, 608, and 510, discussed below. The query additionally includes a set of inputs 512 that include the entire "Orders" table and a single, selected partition of the "Lineitem" table Within each iteration of Subplan A, the operation 506 provides for parsing the "Orders" table to identify all orders that satisfy Criteria A (e.g., orders that have an order date that is prior to Oct. 1, 1993). Additionally, the operation 508 provides for parsing the currently-received partition of the "Lineitem" table to identify all orders satisfying Criteria B (e.g., orders with a commit date easier than the receipt date). The results of the operations 506 and 508 are then joined and aggregated by operation 510, and the results are returned to the host CPU (shown as Subplan Results 522, which is generated and returned for each partition of the Lineitem table).

In one implementation, the host CPU sends each iterative "Subplan A" remote query along with a data movement operator (e.g., a C2H operator, as discussed elsewhere herein). Functionally, this data movement operator serves two roles. First, the inclusion of the data movement operator causes the results of each iteration of Subplan A to be returned to the host. Second, the inclusion of the data movement operator causes the hardware coprocessor 516 to track errors during execution of Subplan A and return error information with each iteration of Subplan A of subplan results 522. If the error information included in an iteration of subplan results 522 indicates that the hardware coprocessor 516 has failed to execute the subplan or if the subplan results 522 are not returned to the host CPU within a threshold period of time following transmission of the remote query, the host CPU acts as a "fallback" processor that executes Subplan A on the failed partition and merges the results with the subplan results 522 received for each other partition of the "Lineitem" table.

In the example of FIG. 5, the host CPU executes Subplan B in response to receiving the subplan results 522 corresponding to each different iteration of the "Lineitem" table (or independently deriving such results while acting as a "fallback processor"). Subplan B includes an aggregation operation 524 that provides for taking the union of all iterations of the subplan results 522 in a single table and a counting operation 526 that provides for counting the total number of rows in the resulting table. Results from the counting operation 526 are returned by the CPU to the requesting client device.

In assessing the viability of the distributed execution plan 504, the database optimizer considers a set of coprocessor characteristics 514 that are sufficient to support the implementation of the plan. In the present example, the coprocessor characteristics 514 require that the hardware coprocessor implementing Subplan A have a usable memory size (Coprocessor Memory Size) larger than the aggregated size of both the "Orders" table and a selected data partition size of each partition of the "Lineitem" table, such that both the Orders table and the currently-selected partition can be stored concurrently. The coprocessor characteristics 514 further require that the hardware coprocessor implementing Subplan A support all logical operators that are used in evaluating both of Criteria A and Criteria B.

Implementation of the distributed execution plan 504 is likely to provide a most notable reduction in computational overhead (latency) in scenarios where all of the following are true: (1) the "Lineitem" table is larger than the available memory size of the hardware coprocessor 516, (2) the hardware coprocessor 516 can accelerate the types of logical operations included in operations 506, 508, and 510; and (3) the number of total partitions of the "Lineitem" table is small enough relative to the partition size that the latency savings realized by accelerating the operations of Subplan A exceeds the total I/O latency incurred by sending each data partition to the hardware coprocessor 516 as a separate query. The database optimizer stores latency metrics (e.g., processor latency metrics 326) that are usable to compute the total latency of the distributed execution plan 504 as compared to a logically equivalent plan that is fully executed by the CPU of the host device. The database optimizer selects the lowest latency plan for implementation.

FIG. 6 illustrates aspects 600 of an example distributed execution plan 604 that is generated by a database optimizer (not shown) in response to a query 602. In FIG. 6, the query 602 is identical to the example query of FIG. 4 and FIG. 5. The query 602 has been delegated for execution to a database host with a hardware coprocessor 616, which may be the same or a different coprocessor as that discussed with respect to the example of FIG. 4.

In the example shown, the distributed execution plan 604 includes Subplan A, Subplan B, and Subplan C. Of these, Subplan C is executed by a host CPU, and Subplans B and C are executed by hardware coprocessor(s) of the host device. Execution of subplan A is initiated via a first remote query that includes operators for executing an operation 608 that evaluates Criteria B on the "Lineitem" table. The query sent to the hardware coprocessor to initiate execution of Subplan A includes the full "Lineitem" table as an input. The operation 608 parses the "Lineitem" table to identify all orders in the table that satisfy criteria B. The results of Subplan A are returned to the host CPU (shown as Results 1)

In this example, Subplan B is initiated by a second query from the CPU that includes operators for executing an operation 510 that evaluates criteria A on the "Orders" table. The remote query initiating Subplan B further includes the full Orders table as an input. The operation 610 parses the "Lineitem" table to identify all orders in the Orders table that satisfy criteria A. The results of Subplan B are returned to the host CPU (shown as Results 2). Following the execution of both Subplan A and Subplan B, the host CPU executes Subplan C. Subplan C includes an operation 512 that provides for identifying and counting the number of orders (e.g., of common order numbers) that commonly appear in both the results of Subplan A (Results 1) and the results of Subplan B (Results 2).

In assessing the viability of the distributed execution plan 606, the database optimizer considers a set of coprocessor characteristics 614 that are sufficient to support the implementation of the plan. In this example, the coprocessor characteristics 614 require that the hardware coprocessor executing Subplan A have a large enough memory to store the "Lineitem" table and also support all logical operators used in evaluating criteria B. The coprocessor characteristics 614 further require that the hardware coprocessor executing Subplan B have a large enough memory to store the "Orders" table and also that the hardware coprocessor executing Subplan B support all logical operators used in evaluating Criteria A.

Notably, there exist multiple scenarios where the distributed execution plan 606 could be viable and potentially provide a reduction in observed latency as compared to alternative execution plans. In a first scenario to consider, there exists a single hardware coprocessor in the database host. Both Subplan A and Subplan B are to be executed by this same hardware coprocessor. In this scenario, the distributed execution plan 604 is likely to be generated and identified as a cost-effective option when the combined size of the "Orders" and "Lineitem" tables is too large to store in the coprocessor memory, but either table is, individually, storable within the coprocessor memory. In this implementation, Subplan A and Subplan B are executed sequentially (on after the other) by the same hardware processor.

In a second scenario to consider, there exist two different hardware coprocessors in the database host. Subplan A is to be executed by the first one of these hardware coprocessors, and Subplan B is to be executed by the other one of these coprocessors. In this scenario, the distributed execution plan 604 is likely to be generated identified as a cost-effective option when one of the two coprocessors in the host device does not support all logical operators of both Subplan A and Subplan B. Assume, for example, the host device includes an FPGA that with usable memory large enough to store both the Orders table and the Lineitem table concurrently; however, the FPGA does not support an operator that is needed to evaluate Criteria A. Further assume that, in addition to the FPGA, the host device also includes a GPU that supports all operators used in evaluating Criteria A and Criteria B. However, the GPU has a usable memory that is not large enough to store the entire Lineitem table. In this case, the database optimizer may determine that delegating Subplans A and B to different coprocessors (e.g., Subplan A to the FPGA and Subplan B to the GPU) results in lower latency than a plan that is fully implemented by the host CPU or a plan that uses the GPU to iteratively evaluate partitions of the line item table (e.g., a plan similar to that described with respect to FIG. 5). In this implementation, Subplan A and Subplan B may be executed concurrently or sequentially by the two different hardware coprocessors.

In still another variation on the distributed execution plan 606 that is not shown in a separate figure, Subplan A and Subplan C are combined into a single subplan that is executed by the host CPU, while Subplan B is executed by the hardware coprocessor. This is potentially a cost-competitive option when the host device includes a single hardware coprocessor, the Lineitem table is too big to store in usable memory of the hardware coprocessor, and the minimum available partition size needed to evaluate the Criteria B results in a number of partitions that is so large that the cumulative latency incurred as a result of sending the partitions and receiving results (e.g., the coprocessor I/O latency) exceeds the latency savings that is realized by accelerating the operations on the Lineitem table.

Figure 7:
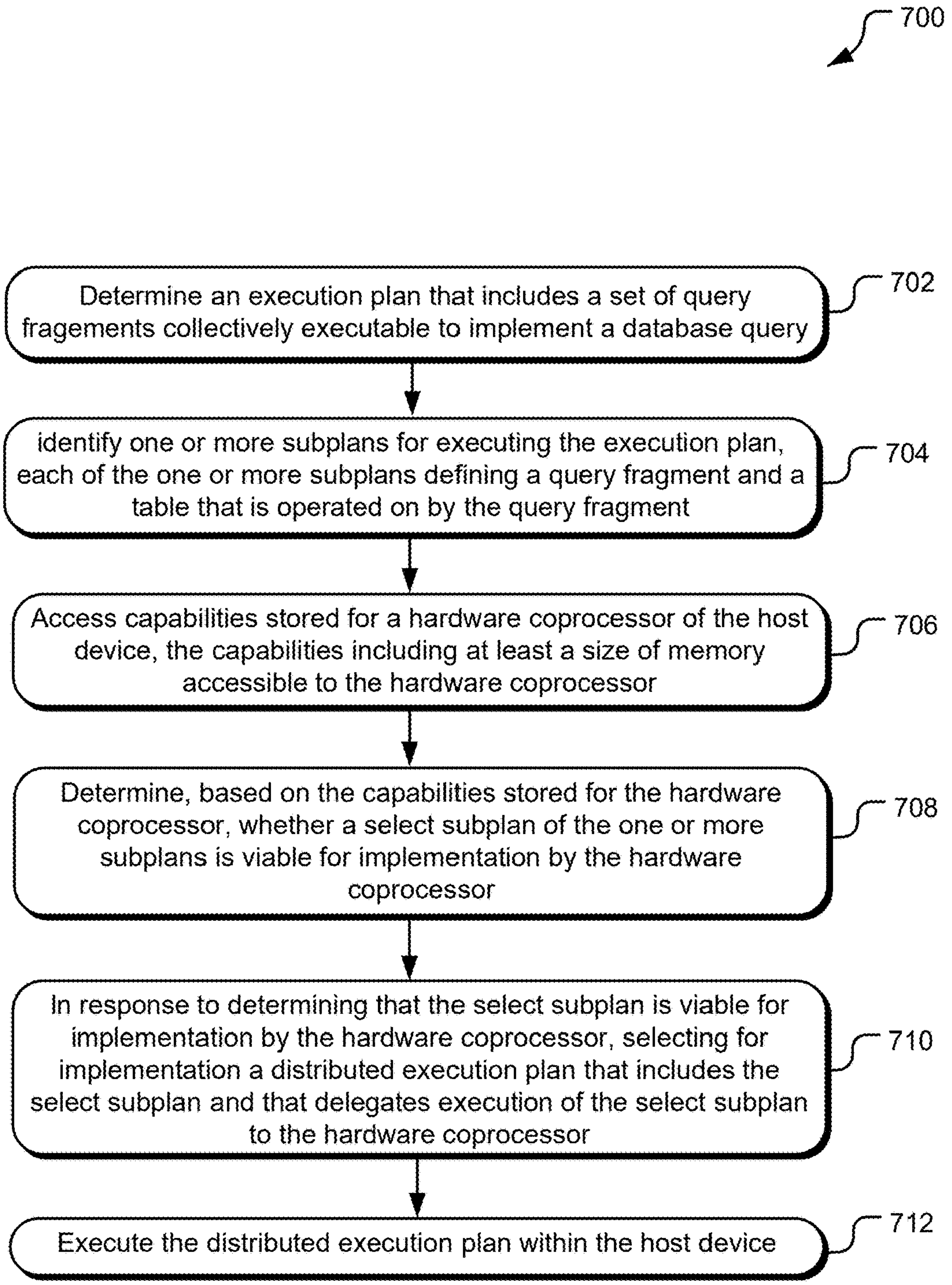
FIG. 7 illustrates example operations for selecting a viable distributed execution plan that utilizes a hardware coprocessor to implement a database query.

FIG. 7 illustrates example operations 700 for selecting a viable distributed execution plan to implement a database query. The operations 700 include a determining operation 702 that determines an execution plan that includes a set of query fragments collectively executable to implement a database query. The execution plan may be a verbatim match of the database query (e.g., an SQL language input composed by an end user or client application) or a variation of the database query, identified by a database optimizer, as being executable to obtain the result for the query.

Another determining operation 704 determines one or more subplans collectively executable (e.g., in series or in parallel) to implement the execution plan. Each subplan defines at least one query fragment and a table that is operated on by the query fragment. In one implementation, a database operator identifies potential "subplans" (e.g., plans delegable to a hardware processor) by identifying partial queries that act on a single database table.

A capability access operation 706 accesses capabilities stored for a hardware coprocessor of the host device. The stored capabilities include at least a size of memory accessible to the hardware coprocessor (e.g., for storing data inputs to a subplan) and may also include logical operators that are or are not supported by the hardware coprocessor.

A determining operation 708 determines, based on the stored capabilities, whether a select subplan of the one or more subplans is viable for implementation by the hardware coprocessor. For example, the operation 708 entails determining whether the hardware coprocessor includes a usable memory large enough to store inputs to the subplan (e.g., one or more tables or portions of tables) and whether the hardware coprocessor supports execution of all logical operators included within the subplan.

In one implementation, the select subplan is derived from the execution plan using the mechanism of table partitionability. In response to determining that the execution plan includes a query fragment with a set of operators that operate on a table that is too large to load into memory of the hardware coprocessor, a database optimizer identifies an array of partitions (e.g., multiple individual partitionable elements) of the first table that can be iteratively (e.g., sequentially) operated on by a first set of operators as an interim step in executing the query fragment. The database optimizer then defines the select subplan, which in this case is a plan executable by the hardware coprocessor that provides for iteratively operating on the multiple partitions of the table with the first set of operators to derive an interim result that is, in turn, sent to the hardware coprocessor for subsequent processing.

In one implementation, the select subplan is derived by the database optimizer in response to determining that the execution plan or database query includes a predicate that contains a first operator not supported by the hardware coprocessor. The database optimizer reconstructs the execution plan or query by splitting the predicate into a first query fragment that excludes the first operator and a second query fragment that includes the first operator. The select subplan is, in this case, a subplan that includes the first query fragment and that excludes the second query fragment.

A selection operation 710 selects a distributed execution plan that includes the select subplan in response to determining that the select subplan is viable for implementation by the hardware coprocessor. The distributed execution plan includes the select subplan. In one implementation, the selection operation 710 includes storing first distributed execution plan that includes the subplan and evaluating a latency of the first distributed execution plan based, at least in part, on latency metrics that are stored for the hardware coprocessor including data transfer speeds (e.g., to and from the hardware coprocessor) and computation speeds associated with specific logical operators and data sizes. In this way, latency of the distributed execution plan may be evaluated and compared to similarly computed latency determined for one or more other alternative distributed execution plans, determined to viable, that also implement the same query.

In response to the selection operation 710, an implementation operation 512 executes the distributed execution plan within the host device. Executing the distributed execution plan includes transmitting, by a CPU of the host device, the select subplan to the hardware coprocessor. The subplan is transmitted to the hardware coprocessor along with a data movement operator that instructs the hardware coprocessor to return the results of the subplan, along with error information pertaining to plan execution, to the CPU of the host device. In some implementations, the host device is configured to re-execute the subplan in response to receiving a response from the hardware coprocessor that identifies an error observed during execution of the subplan. In other implementations the host device is configured to re-execute the subplan when no response is received from the hardware coprocessor within a threshold period of time following transmission of the subplan. This increases fault protection of the database system by allowing the CPU to dynamically "change" the execution plan and self-execute components initially delegated to the hardware coprocessor at times when the hardware processor is unavailable.

Figure 8:
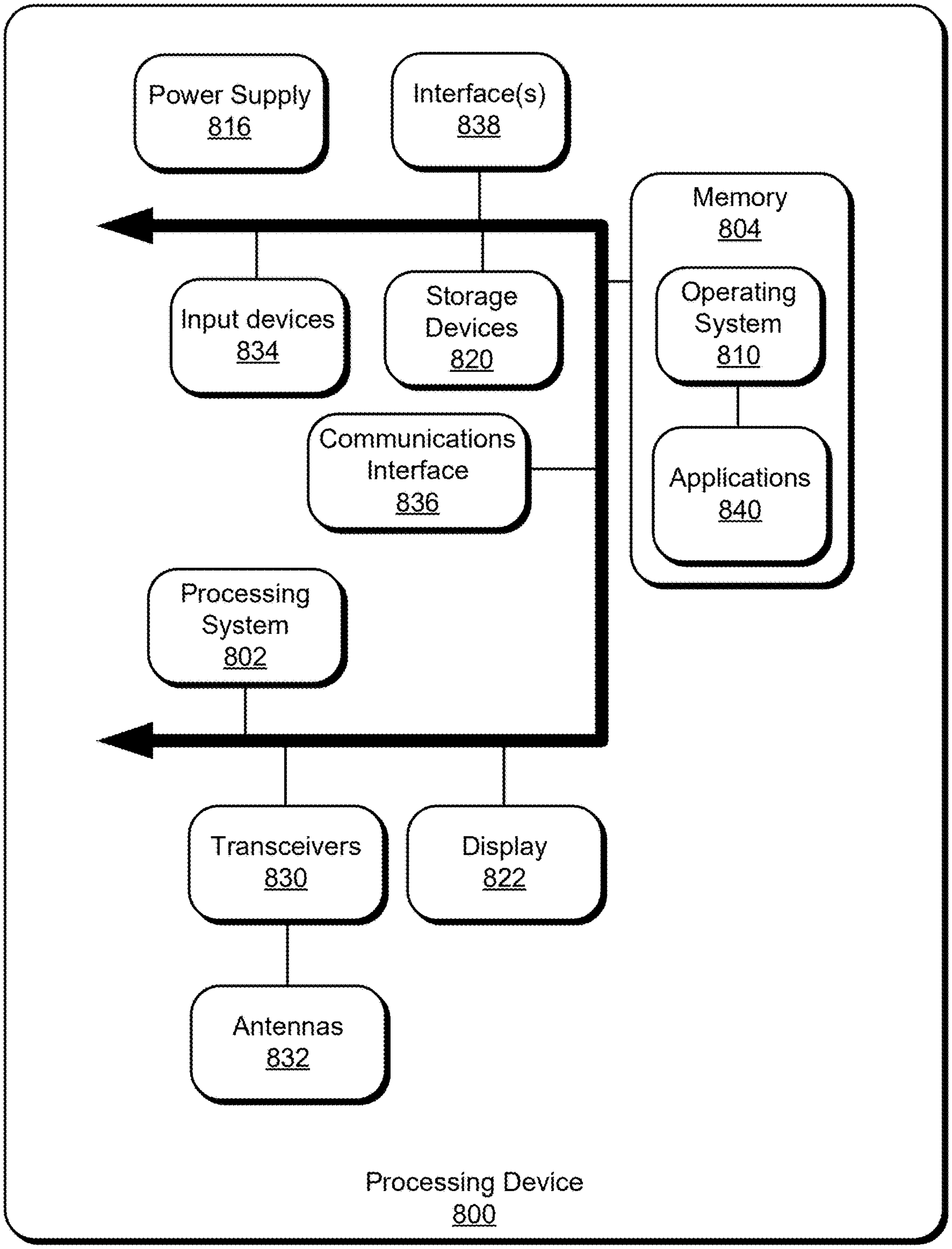
FIG. 8 illustrates an example schematic of a processing device suitable for implementing aspects of the disclosed technology.

FIG. 8 illustrates an example computing device 800 for use in implementing the described technology. The computing device 800 may be a database host machine or a machine implementing other aspects of a database management system, including a database optimizer. The computing device 800 includes a processing system 802. In implementations where the computing device 800 is a database host device, the processing system 802 includes at least one CPU and one or more hardware coprocessors, such as FPGAs, GPUs, and ASICs. The memory 804 generally includes both volatile memory (e.g., RAM) and nonvolatile memory (e.g., flash memory), although one or the other type of memory may be omitted. An operating system 810 resides in the memory 804 and is executed by the processing system 802. In some implementations, the computing device 800 includes and/or is communicatively coupled to storage 820.

In the example computing device 800, one or more software modules, segments, and/or processors, such as applications 850 (e.g., a database optimizer 302) are loaded into the operating system 810 on the memory 804 and/or the storage 820 and executed by the processing system 802. The storage 820 may store processor latency metrics (e.g., processor latency metrics 326) as well as hardware coprocessor capabilities (e.g., hardware coprocessor capabilities 316)

The computing device 800 may include one or more communication transceivers 830, which may be connected to one or more antenna(s) 832 to provide network connectivity (e.g., mobile phone network, Wi-Fi®, Bluetooth®) to one or more other servers, client devices, IoT devices, and other computing and communications devices. The computing device 800 may further include a communications interface 836 (such as a network adapter or an I/O port, which are types of communication devices) that is used to establish connections over a wide-area network (WAN) or local-area network (LAN). It should be appreciated that the network connections shown are exemplary and that other communications devices and means for establishing a communications link between the computing device 800 and other devices may be used.

The computing device 800 may include one or more input devices 834 such that a user may enter commands and information (e.g., a keyboard, trackpad, or mouse). These and other input devices may be coupled to the server by one or more interfaces 838, such as a serial port interface, parallel port, or universal serial bus (USB). The computing device 800 may further include a display 822, such as a touchscreen display.

The computing device 800 may include a variety of tangible processor-readable storage media and intangible processor-readable communication signals. Tangible processor-readable storage can be embodied by any available media that can be accessed by the computing device 800 and can include both volatile and nonvolatile storage media and removable and non-removable storage media. Tangible processor-readable storage media excludes intangible, transitory communications signals (such as signals per se) and includes volatile and nonvolatile, removable, and non-removable storage media implemented in any method, process, or technology for storage of information such as processor-readable instructions, data structures, program modules, or other data. Tangible processor-readable storage media includes but is not limited to RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 800. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

In some aspects, the techniques described herein relate to a database management system including: a host device that includes both a central processing system and a hardware coprocessor; and a database optimizer stored in memory and executable by a processor to: identify one or more subplans for executing query fragments of a database query, each of the one or more subplans defining at least one query fragment and a table that is operated on by the at least one query fragment; determine, based on capabilities stored for the hardware coprocessor, whether a select subplan of the one or more subplans is viable for implementation by the hardware coprocessor, the capabilities including at least a size of memory accessible to the hardware coprocessor; and in response to determining that the select subplan is viable for implementation by the hardware coprocessor, selecting for execution a distributed execution plan that includes the select subplan and that associates the select subplan with the hardware coprocessor, In some aspects, the techniques described herein relate to a database management system, wherein the central processing system executes the distributed execution plan, at least in part, by transmitting the select subplan to the hardware coprocessor, and wherein the distributed execution plan includes a data movement operator executable to cause the hardware coprocessor to return an execution result of the select subplan back to the central processing system of the host device.

In some aspects, the techniques described herein relate to a database management system, wherein the data movement operator is executable by the hardware coprocessor to: record error information pertaining to errors observed during execution of the select subplan; and include, within the execution result of the select subplan, the error information and instructions that cause the central processing system to re-execute the select subplan upon receipt of the execution result.

In some aspects, the techniques described herein relate to a database management system, wherein the database optimizer identifies multiple distributed execution plans that each define a different set of subplans collectively executable to carry out the database query, each of the multiple distributed execution plans delegating different query fragments to the host device and the hardware coprocessor.

In some aspects, the techniques described herein relate to a database management system, wherein the database optimizer is further executable to: determine an estimated latency of the distributed execution plan that includes select subplan based on latency metrics stored for the hardware coprocessor; and select the distributed execution plan for implementation in response to determining that the estimated latency of the distributed execution plan is lower than the estimated latency of at least one other execution plan executable to carry out the database query.

In some aspects, the techniques described herein relate to a database management system, wherein the database optimizer determines whether the select subplan is viable for execution by the hardware coprocessor by operations that include at least one of: determining whether memory accessible to the hardware coprocessor is larger than a size of the table operated on by the at least one query fragment of the select subplan; and determining whether the hardware coprocessor supports operators within the at least one query fragment of the select subplan.

In some aspects, the techniques described herein relate to a database management system, wherein the query fragments include a first query fragment that operates on a first table and the database optimizer is further configured to: determine multiple partitions in the first table that can be sequentially operated on by a first set of operators as an interim step in execution of the first query fragment, wherein the select subplan provides for iteratively operating on the multiple partitions with the first set of operators.

In some aspects, the techniques described herein relate to a database management system, wherein the query fragments include a predicate and the database optimizer is further configured to: determine, based on the capabilities of the hardware coprocessor, that the predicate that contains a first operator not supported by the hardware coprocessor; split the predicate into a first query fragment that excludes the first operator and a second query fragment that includes the first operator, wherein the distributed execution plan delegates the first query fragment to the hardware coprocessor and the second query fragment to the central processing system.

In some aspects, the techniques described herein relate to a database management system, wherein the database optimizer determines an estimated execution latency for each of multiple viable distributed execution plans and selects the distributed execution plan for implementation based on the estimated execution latency, and wherein determining the estimated execution latency for the distributed execution plan includes estimating execution latency for each subplan included in the distributed execution plan based on latency reference values stored for the hardware coprocessor in association with one or more operators identified within the select subplan.

In some aspects, the techniques described herein relate to a database management system, wherein the database optimizer identifies multiple distributed execution plans that each define a different set of subplans collectively executable to carry out the database query, each of the multiple distributed execution plans delegating different query fragments to the host device and the hardware coprocessor.

In some aspects, the techniques described herein relate to one or more tangible computer-readable storage media encoding processor-executable instructions for implementing a computer process for selecting an execution plan for implementing a database query at a host device, the processor-executable instructions including operations for: determining query fragments collectively executable to implement the database query; identifying one or more subplans for executing the query fragments, each of the one or more subplans defining at least one query fragment and a table that is operated on by the at least one query fragment; accessing capabilities of a hardware coprocessor of the host device, the capabilities including at least a size of memory accessible to the hardware coprocessor; determine, based on the capabilities stored for the hardware coprocessor, whether a select subplan of the one or more subplans is viable for implementation by the hardware coprocessor; and in response to determining that the select subplan is viable for implementation by the hardware coprocessor, selecting for implementation a distributed execution plan that includes the select subplan and that delegates execution of the select subplan to the hardware coprocessor; and executing the distributed execution plan by a host device.

In some aspects, the techniques described herein relate to a tangible computer-readable storage media, wherein a central processing system of the host device transmits the select subplan to the hardware coprocessor along with a data movement operator executable to cause the hardware coprocessor to return an execution result of the select subplan back to the central processing system of the host device.

In some aspects, the techniques described herein relate to a tangible computer-readable storage media, wherein the data movement operator is executable by the hardware coprocessor to: record error information pertaining to errors observed during execution of the select subplan; and include, within the execution result of the select subplan, the error information and instructions that cause the central processing system to re-execute the select subplan upon receipt of the execution result.

In some aspects, the techniques described herein relate to a tangible computer-readable storage media, further including: identifying multiple distributed execution plans that each define a different set of subplans collectively executable to carry out the database query, each of the multiple distributed execution plans delegating different query fragments to the host device and the hardware coprocessor.

In some aspects, the techniques described herein relate to a tangible computer-readable storage media, wherein determining whether the hardware coprocessor is capable of executing the select subplan further includes: determining whether memory accessible to the hardware coprocessor is larger than a size of the table operated on by the at least one query fragment of the select subplan; and determining whether the hardware coprocessor supports operators within the at least one query fragment of the select subplan.

In some aspects, the techniques described herein relate to a tangible computer-readable storage media, wherein identifying the one or more subplans for executing the query fragments further includes: identifying a query fragment for executing a portion of the database query, the query fragment operating on a table that is too large to load into memory of the hardware coprocessor; and identifying multiple partitions in the table that can be sequentially operated on by a first set of operators as an interim step in execution of the query fragment, wherein the select subplan provides for sequentially operating on the multiple partitions with the first set of operators.

In some aspects, the techniques described herein relate to a tangible computer-readable storage media, wherein identifying the one or more subplans for executing the query fragments further includes: identifying a query fragment for executing a portion of the database query, the query fragment including a predicate; and determining, based on the capabilities of the hardware coprocessor, that the predicate that contains a first operator not supported by the hardware coprocessor; splitting the predicate into a first query fragment that excludes the first operator and a second query fragment that includes the first operator, wherein the distributed execution plan delegates the first query fragment to the hardware coprocessor and the second query fragment to a central processing system of the host device.

In some aspects, the techniques described herein relate to a database management system including: memory; and a database optimizer stored in the memory and executable by a processor to: access capabilities stored for a hardware coprocessor included within a host device, the capabilities including at least a size of memory accessible to the hardware coprocessor; based at least in part on the capabilities stored for the hardware coprocessor, select a distributed execution plan that includes query fragments collectively executable to execute a database query on the host device, the distributed execution plan including a subplan and a data movement operator to be executed by a hardware coprocessor of the host device; a central processing system in the host device that receives the distributed execution plan and that transmits the subplan to the hardware coprocessor along with the data movement operator, the data movement operator causing the hardware coprocessor to transmit error information associated with execution of the subplan back to the central processing system in response to executing at least a portion of the subplan.

In some aspects, the techniques described herein relate to a database management system, wherein the error information indicates that the subplan failed to execute on the hardware coprocessor and the central processing system executes the subplan in response to receiving the error information.

In some aspects, the techniques described herein relate to a database management system, wherein the distributed execution plan is selected, at least in part, in response to: determining, based on the capabilities stored for the hardware coprocessor, that the memory accessible to the hardware coprocessor is larger than a size of a table operated on by a query fragment included in the subplan; and determining, based on the capabilities, that the hardware coprocessor supports operators the query fragment.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of example implementations.

What is claimed is:

1. A database management system including:

a host device that includes a central processing system and a hardware coprocessor; and a database optimizer stored in memory and executable by a processor to:

identify one or more subplans for executing query fragments of a database query, each of the one or more subplans defining at least one query fragment and a table that is operated on by the at least one query fragment;

determine, based on capabilities stored for the hardware coprocessor, whether a select subplan of the one or more subplans is viable for implementation by the hardware coprocessor, the capabilities including at least a size of memory accessible to the hardware coprocessor; and in response to determining that the select subplan is viable for implementation by the hardware coprocessor, select for execution a distributed execution plan for distributing the query fragments of the database query among the central processing system of the host device and the hardware coprocessor of the host device, the distributed execution plan delegating execution of the select subplan to the hardware coprocessor.

2. The database management system of claim 1, wherein the database optimizer determines whether the select subplan is viable for execution by the hardware coprocessor by operations that include at least one of:

determining whether a size of memory accessible to the hardware coprocessor is larger than a size of the table operated on by the at least one query fragment of the select subplan; and determining whether the hardware coprocessor supports operators within the at least one query fragment of the select subplan.

3. The database management system of claim 1, wherein the central processing system executes the distributed execution plan, at least in part, by transmitting the select subplan to the hardware coprocessor, and wherein the distributed execution plan includes a data movement operator executable to cause the hardware coprocessor to return an execution result of the select subplan back to the central processing system of the host device.

4. The database management system of claim 3, wherein the data movement operator is executable by the hardware coprocessor to:

record error information pertaining to errors observed during execution of the select subplan; and include, within the execution result of the select subplan, the error information and instructions that cause the central processing system to re-execute the select subplan upon receipt of the execution result.

5. The database management system of claim 1, wherein the database optimizer identifies multiple distributed execution plans that each define a different set of subplans collectively executable to carry out the database query, each of the multiple distributed execution plans delegating different query fragments to the host device and the hardware coprocessor.

6. The database management system of claim 1, wherein the database optimizer is further executable to:

determine an estimated latency of the distributed execution plan that includes the select subplan based on latency metrics stored for the hardware coprocessor; and select the distributed execution plan for implementation in response to determining that the estimated latency of the distributed execution plan is lower than the estimated latency of at least one other execution plan executable to carry out the database query.

7. The database management system of claim 1, wherein the query fragments include a first query fragment that operates on a first table and the database optimizer is further configured to:

determine multiple partitions in the first table that can be sequentially operated on by a first set of operators as an interim step in execution of the first query fragment, wherein the select subplan provides for using the hardware coprocessor to iteratively operate on the multiple partitions with the first set of operators.

8. The database management system of claim 1, wherein the query fragments include a predicate and the database optimizer is further configured to:

determine, based on the capabilities of the hardware coprocessor, that the predicate contains a first operator not supported by the hardware coprocessor;

in response to determining that the predicate contains the first operator, split the predicate into a first query fragment that excludes the first operator and a second query fragment that includes the first operator, wherein the distributed execution plan delegates the first query fragment to the hardware coprocessor and the second query fragment to the central processing system.

9. The database management system of claim 1, wherein the database optimizer determines an estimated execution latency for each of multiple viable distributed execution plans and selects the distributed execution plan for implementation in response to determining that the distributed execution plan has a lowest value of the estimated execution latency among the multiple viable distributed execution plans;

and wherein determining the estimated execution latency for the distributed execution plan includes estimating execution latency for each subplan included in the distributed execution plan based on latency reference values stored for the hardware coprocessor in association with one or more operators identified within the select subplan.

10. One or more tangible computer-readable storage media encoding processor-executable instructions for implementing a computer process for selecting an execution plan for implementing a database query at a host device, the processor-executable instructions including operations for:

determining query fragments collectively executable to implement the database query;

identifying one or more subplans for executing the query fragments, each of the one or more subplans defining at least one query fragment and a table that is operated on by the at least one query fragment;

accessing capabilities of a hardware coprocessor of the host device, the capabilities including at least a size of memory accessible to the hardware coprocessor;

determining, based on the capabilities stored for the hardware coprocessor, whether a select subplan of the one or more subplans is viable for implementation by the hardware coprocessor;

in response to determining that the select subplan is viable for implementation by the hardware coprocessor, selecting for implementation a distributed execution plan for distributing the query fragments of the database query among a central processing system of the host device and the hardware coprocessor of the host device, the distributed execution plan delegating the select subplan to the hardware coprocessor; and executing the distributed execution plan by the host device.

11. The tangible computer-readable storage media of claim 10, wherein determining whether select subplan is viable for implementation by the hardware coprocessor further comprises:

determining whether a size of memory accessible to the hardware coprocessor is larger than a size of the table operated on by the at least one query fragment of the select subplan; and determining whether the hardware coprocessor supports operators within the at least one query fragment of the select subplan.

12. The tangible computer-readable storage media of claim 10, wherein the central processing system of the host device transmits the select subplan to the hardware coprocessor along with a data movement operator executable to cause the hardware coprocessor to return an execution result of the select subplan back to the central processing system of the host device.

13. The tangible computer-readable storage media of claim 12, wherein the data movement operator is executable by the hardware coprocessor to:

record error information pertaining to errors observed during execution of the select subplan; and include, within the execution result of the select subplan, the error information and instructions that cause the central processing system to re-execute the select subplan upon receipt of the execution result.

14. The tangible computer-readable storage media of claim 10, further comprising:

identifying multiple distributed execution plans that each define a different set of subplans collectively executable to carry out the database query, each of the multiple distributed execution plans delegating different query fragments to the host device and the hardware coprocessor.

15. The tangible computer-readable storage media of claim 10, wherein identifying the one or more subplans for executing the query fragments further comprises:

identifying a query fragment for executing a portion of the database query, the query fragment operating on a table that is too large to load into memory of the hardware coprocessor; and identifying multiple partitions in the table that can be sequentially operated on by a first set of operators as an interim step in execution of the query fragment, wherein the select subplan provides for sequentially operating on the multiple partitions with the first set of operators.

16. The tangible computer-readable storage media of claim 10, wherein identifying the one or more subplans for executing the query fragments further comprises:

identifying a query fragment for executing a portion of the database query, the query fragment including a predicate; and determining, based on the capabilities of the hardware coprocessor, that the predicate that contains a first operator not supported by the hardware coprocessor;

in response to determining that the predicate contains the first operator, splitting the predicate into a first query fragment that excludes the first operator and a second query fragment that includes the first operator, wherein the distributed execution plan delegates the first query fragment to the hardware coprocessor and the second query fragment to a central processing system of the host device.

17. A database management system including:

memory; and a database optimizer stored in the memory and executable by a processor to:

access capabilities stored for a hardware coprocessor included within a host device, the capabilities including at least a size of memory accessible to the hardware coprocessor;

based at least in part on the capabilities stored for the hardware coprocessor, select a distributed execution plan that includes query fragments collectively executable to execute a database query on the host device, the distributed execution plan including a subplan and a data movement operator to be executed by the hardware coprocessor of the host device;

a central processing system in the host device that receives the distributed execution plan and that transmits the subplan to the hardware coprocessor along with the data movement operator, the data movement operator causing the hardware coprocessor to transmit error information associated with execution of the subplan back to the central processing system in response to executing at least a portion of the subplan.

18. The database management system of claim 17, wherein the error information indicates that the subplan failed to execute on the hardware coprocessor and the central processing system executes the subplan in response to receiving the error information.

19. The database management system of claim 17, wherein the distributed execution plan is selected, at least in part, in response to:

determining, based on the capabilities stored for the hardware coprocessor, that a size of memory accessible to the hardware coprocessor is larger than a size of a table operated on by a query fragment included in the subplan; and determining, based on the capabilities, that the hardware coprocessor supports operators the query fragment.

* * * * *